Dec. 1, 1970  A. UNGLAUBE  3,543,372
TILTING DEVICE FOR HINGE MAKING MACHINES
Filed March 7, 1968  2 Sheets-Sheet 1

INVENTOR
A. Unglaube
BY
Richards & Geier
ATTORNEYS

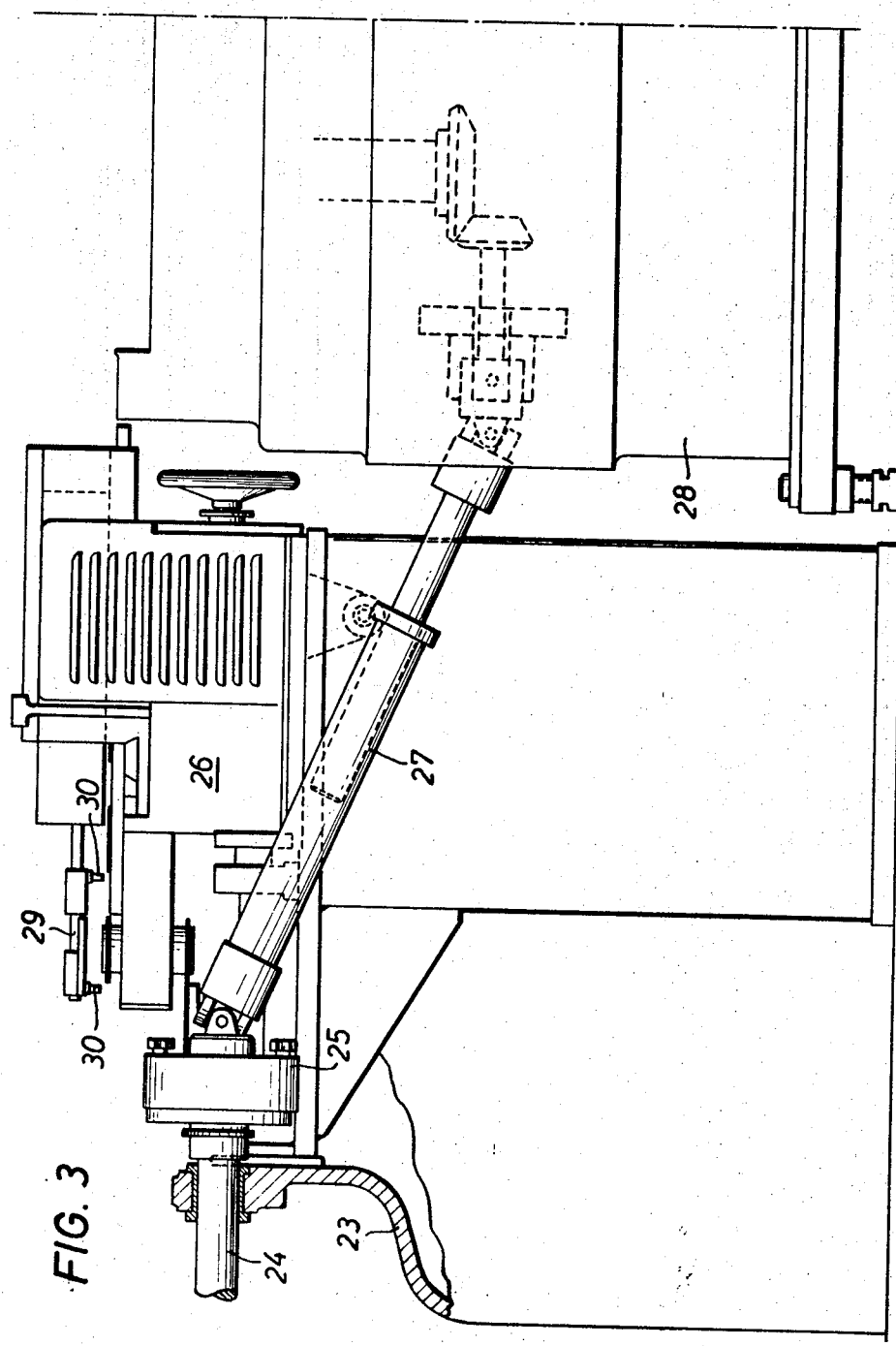

United States Patent Office 3,543,372
Patented Dec. 1, 1970

3,543,372
TILTING DEVICE FOR HINGE MAKING MACHINES
Alfons Unglaube, Rodenkirchen Bezirk Cologne, Germany, assignor to Meyer, Roth & Pastor, Raderberg-Cologne, Germany, a corporation of Germany
Filed Mar. 7, 1968, Ser. No. 711,437
Claims priority, application Germany, Mar. 18, 1967, M 73,245
Int. Cl. B23p *19/00, 19/04;* B21d *53/40*
U.S. Cl. 29—200          5 Claims

ABSTRACT OF THE DISCLOSURE

A device for tilting and transporting hinge halves is located between a rolling machine and an assembling machine. In the rolling machine hinge halves are formed and are placed on two guides. Then they are transported to tilting guides which tilt them so that properly spaced curved portions of the hinge halves face each other. Then slides push the hinge halves against each other to form hinges. These hinges are transported to the assembling machine, wherein pins are inserted into the hinges and their construction is completed.

---

This invention relates to the manufacture of hinges.

In prior art two hinge halves which fit into each other, including their straps and bore holes, were pressed out of sheets and then collected in magazines. These magazines were then presented to a second machine, namely a rolling machine, wherein the hinge halves were placed by a transporting device upon two parallel guide rails and moved stepwise thereon. The curved portions formed by the machine extend outwardly to make it possible to provide rolling machines of small width and to be able to apply the various treating machines from the outside with a saving of space; this arrangement also makes it possible to effectively supervise the tools and the workpieces during the treatment and to make them readily accessible.

In this construction it is necessary to move the hinge halves before they can be combined in a third machine, namely the assembling machine, into a position in which their curved portions face each other. Heretofore the hinge halves had to be removed from the outlet of the rolling machine in two containers and were inserted manually into the assembling machine.

An object of the present invention is to improve prior art constructions by providing a completely automatic transport from the rolling machine to the assembling machine.

Other objects will become apparent in the course of the following specification.

In the accomplishment of the objectives of the present invention it was found desirable to provide a tilting and transporting device having guide rails and tilting guides. At least one tilting guide is located along a continuation of each guide rail and above the rail; it is swingable to the extent of 180° about an axis parallel to the guide rail. The tilting guide is provided with holding guides which correspond to the guiding rail of the rolling machine, so that the hinge halves can be shifted by a transporting device connected with the rolling machine from a guide rail of the rolling machine and upon the corresponding holding guide of the tilting guide, whereby the curved portions of the hinge halves will be directed outwardly. If the tilting guide is then rotated to the extent of 180°, the hinge halves will be moved to a position in which their curved portions face each other, irrespective as to whether the two opposed tilting guides were rotated in the same or opposite directions. According to the present invention the tilting device has upper guide rails constituting a continuation of the holding guides and extending in the general operational direction, so that the tilted hinge halves can be pushed into them by a transporting device of the type known in prior art. These upper guide rails are continued by known devices joining the opposed hinge halves; these devices consist of two slides located beyond the tilting guides and movable toward each other within the plane of the hinges to fit two hinge halves one into the other.

The transporting device which is connected with the tilting device of the present invention and which is of the type known per se is used not only for pushing two hinge halves in their high position out of the tilting devices but is also used for shifting the connected hinges and pushing them into the assembling machine which is provided with guides corresponding to those feeding the hinges out of the tilting device. In the assembling machine a pin is inserted into the hinge, the projecting ends of the pin are rolled up and the finished hinge is removed. This assembling machine is known in prior art and can have any desired construction; it can operate in a longitudinal direction or it can have a rotary plate provided with four operating locations. One of these locations serves for receiving a hinge emerging from the tilting and joining device of the present invention, while the pin is inserted into the hinge at the other location; at the third location the ends of the pin are rolled up and the finished hinge is removed from the fourth location.

The rolling machine and the assembling machine do not constitute any part of the present invention.

To simplify and improve the construction of the tilting device of the present invention, it is advisable to provide two tilting guides extending at an angle of 180° for the tilting of each hinge half. However, the tilting can be accomplished with one tilting guide or with more than two tilting guides. The operation of the tilting guides must correspond to the operations of the rolling and assembling machines which conform to each other; for that reason alone, it is advisable to have not more than two, but also not less than two tilting guides in each tilting section. It is also advisable to provide for this construction a stepwise switching connection with a Maltese cross or the like and to actuate the two tilting sections by a gear transmission or the like.

A further simplification and improvement consists in that the drive of the tilting and transporting device of the present invention is carried out by the intermediate use of a cardan shaft with a coupling, while in the same manner, the assembling machine can be used as either the drive for the tilting device or, still better, can receive its drive from the rolling machine through the tilting device. In this way it is possible to switch off the tilting and transporting device of the present invention, which does not require a separate drive, and to actuate the rolling machine as well as the assembling machine independently so that, in case the automatic operation of the device of the present invention is found too expensive for articles of certain size, a transfer to manual operation is possible. For this change, a separate cardan shaft can be also used for connecting the rolling machine with the assembling machine or vice versa, to provide a single drive for the entire unit.

The invention will appear more clearly from the following detailed description when taken in connection with the accompanying drawings, showing by way of example, a preferred embodiment of the inventive idea.

In the drawings:

FIG. 3 is a side view, partly in section, of a machine assembly.

Figure 2:
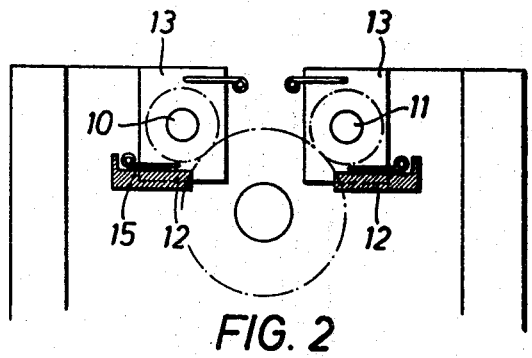
FIG. 2 is a section along the line II—II of FIG. 1.
Figure 1:
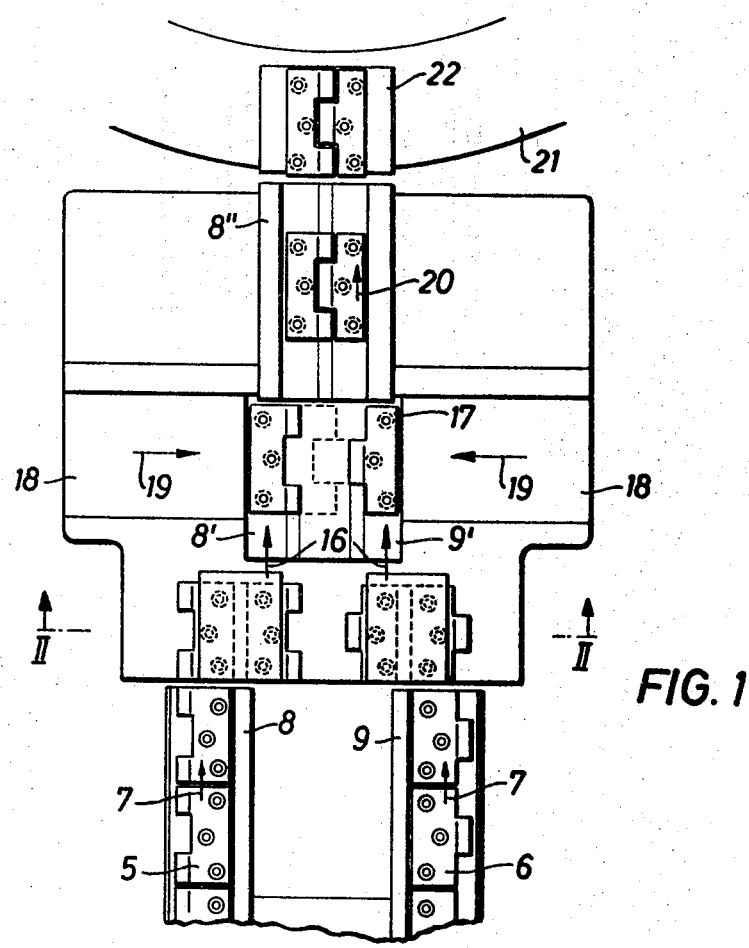
FIG. 1 is a diagrammatic top view of the device constructed in accordance with the present invention.

FIG. 3 shows a rolling machine 23 having a driving shaft 24. The rolling machine makes the hinge halves 5 and 6 (FIG. 1). A coupling 25 connects the rolling machine with the tilting device 26 of the present invention.

As shown in FIG. 1, the hinge halves 5 and 6 are transported in pairs in the direction of arrows 7 upon guide rods 8 and 9 which are symmetrical and extend parallel to each other. The guide rods 8 and 9 constitute a part of the rolling machine 23.

The device effecting the feed is not shown in the drawings and may consist of reciprocated transporting rods located under the guide rails and provided with upwardly extending resilient fingers which engage the hinge halves.

The tilting device 26 of the present invention includes two tilting axles 10 and 11 located along a continuation of the guide rails and above them. Each of the axles carries two tilting guides 12, 13 in the shape of rectangles provided with holding guides 15. The tilting guides are rotatable to the extent of 180° about an axis extending parallel to the direction of the guide rails. The guides 15 correspond to the guide rods 8 and 9 but are so shaped that, when the hinge halves are moved upon them, they hold the hinge halves in their longitudinal and transverse directions and prevent their turning so that the hinge curvatures are located at the same height. Then the tilting guides 12, 13 are turned to the extent of 180° so that the hinge halves are tilted to positions wherein their curved portions extend toward each other. The tilting guides are preferably connected by a gear drive (not shown); they must be actuated stepwise in conformity with the operational sequence of the rolling and assembling machines by any suitable means, which are also not illustrated.

After the tilting, transporting fingers 30 which are connected with the tilting device by a transporting device 29 (FIG. 3) push the hinge halves out of the tilting device in the direction of the arrows 16 (FIG. 1), whereupon they land upon guides 8' and 9' in the position indicated by the numeral 17. These guides constitute a continuation of the guides 15. Slides 18 are actuated in the directions of the arrows 19 to join each pair of corresponding hinge halves to form a single hinge. The same transporting fingers which moved the hinge halves from the tilting device to the joining location now move the hinges further upon the guide 8" in the direction of the arrow 20 to the outlet location and then transmit them directly to the mounting machine 21 which in the example illustrated is a turn-table having upon its circumference four uniformly located guide rails 22. FIG. 1 shows one of these guide rails 22 in the receiving location. The second guide rail, not shown, is in a location wherein a pin is inserted through the hinge. At the third guide rail the projecting ends of the pin are rolled off, while the completed hinge is removed from the fourth location.

FIG. 3 shows the rolling machine 23 which is coupled by means of a driving shaft 24 and a coupling 25 with the tilting device 26. A cardan shaft 27 connects the tilting device with the assembling machine 28. The cardan shaft 27 is also connected with the coupling 25. The transporting device 29 with the transporting fingers 30 for moving the hinges from the tilting device into the assembling machine is also shown in FIG. 3.

It is apparent that the example described above has been given only by way of illustration and not by way of limitation and that it is capable of many variations and modifications within the scope of the present invention. All such variations and modifications are to be included within the scope of the present invention.

What is claimed is:

1. A device for tilting and transporting hinge halves from a rolling machine to an assembling machine, said rolling machine comprising two parallel guide rails for transporting hinge halves, said device comprising two tilting guides located above and beyond each guide rail and swingable to the extent of 180° and a holding guide associated with each tilting guide, said holding guides being adapted to receive said hinge halves from said guide rails, said tilting guides being adapted to tilt said hinge halves so that curved portions of the hinge halves face each other, two other guides adapted to receive hinge halves from said holding guides, slides associated with the last-mentioned guides for joining opposed hinge halves to form a single hinge, a guide associated with said slides for transporting the hinges to the assembling machine, and means moving the hinge halves from said guide rails to said holding guides and from said holding guides to said other guides and moving hinges along the last-mentioned guide.

2. A device in accordance with claim 1, having two tilting guides associated with each guide rail and forming an angle of 180°.

3. A device in accordance with claim 1, comprising means connecting said tilting device with said rolling and assembling machines, whereby said tilting guides are actuated intermittently in conformity with the operations of the rolling and assembling machines.

4. A device in accordance with claim 3, wherein said rolling machine comprises a shaft and a coupling connected with said shaft and said tilting device.

5. A device in accordance with claim 3, comprising a cardan shaft connected with the rolling and assembling machines and with said tilting device.

References Cited

UNITED STATES PATENTS

| 3,396,451 | 8/1968 | Di Margio et al. | 29—200 |
| 3,381,358 | 5/1968 | Eitzinger | 29—208 |

THOMAS H. EAGER, Primary Examiner

U.S. Cl. X.R.

29—11, 208